United States Patent [19]

Van Slyke

[11] 3,718,814
[45] Feb. 27, 1973

[54] FIBER OPTIC ILLUMINATOR AND METHOD OF MAKING SAME

[75] Inventor: Allan S. Van Slyke, Southington, Ohio

[73] Assignee: General Motors Corporation, Detroit, Mich.

[22] Filed: March 27, 1972

[21] Appl. No.: 238,457

[52] U.S. Cl. ............... 240/8.16, 240/1 EL, 350/96 B
[51] Int. Cl. ............................................... B60q 3/04
[58] Field of Search .......... 240/1 EL, 8.16; 350/96 B

[56] References Cited

UNITED STATES PATENTS

| | | | |
|---|---|---|---|
| 2,186,143 | 1/1940 | Neugass | 128/23 X |
| 3,131,690 | 5/1964 | Innis et al. | 240/1 EL |
| 3,278,739 | 10/1966 | Royka et al. | 240/8.16 X |
| 3,423,581 | 1/1969 | Baer | 240/8.16 |
| 3,654,452 | 4/1972 | Frey et al. | 240/8.16 |

Primary Examiner—Samuel S. Matthews
Assistant Examiner—Richard M. Sheer
Attorney—Jean L. Carpenter et al.

[57] ABSTRACT

A conventional fiber optic light conductor comprising a bundle of filaments arranged in a generally circular cross-section and covered with an opaque jacket, has a portion thereof formed into a flat large area illuminator emitting light laterally of the axis of the bundle by removing the jacket from the portion of the bundle where the illuminator is desired, spreading the filaments out into a flat array and securing the filaments to a flat retaining member. The low index of refraction coating of the filaments is at least partially disrupted to allow escape of light laterally from the filaments.

4 Claims, 5 Drawing Figures

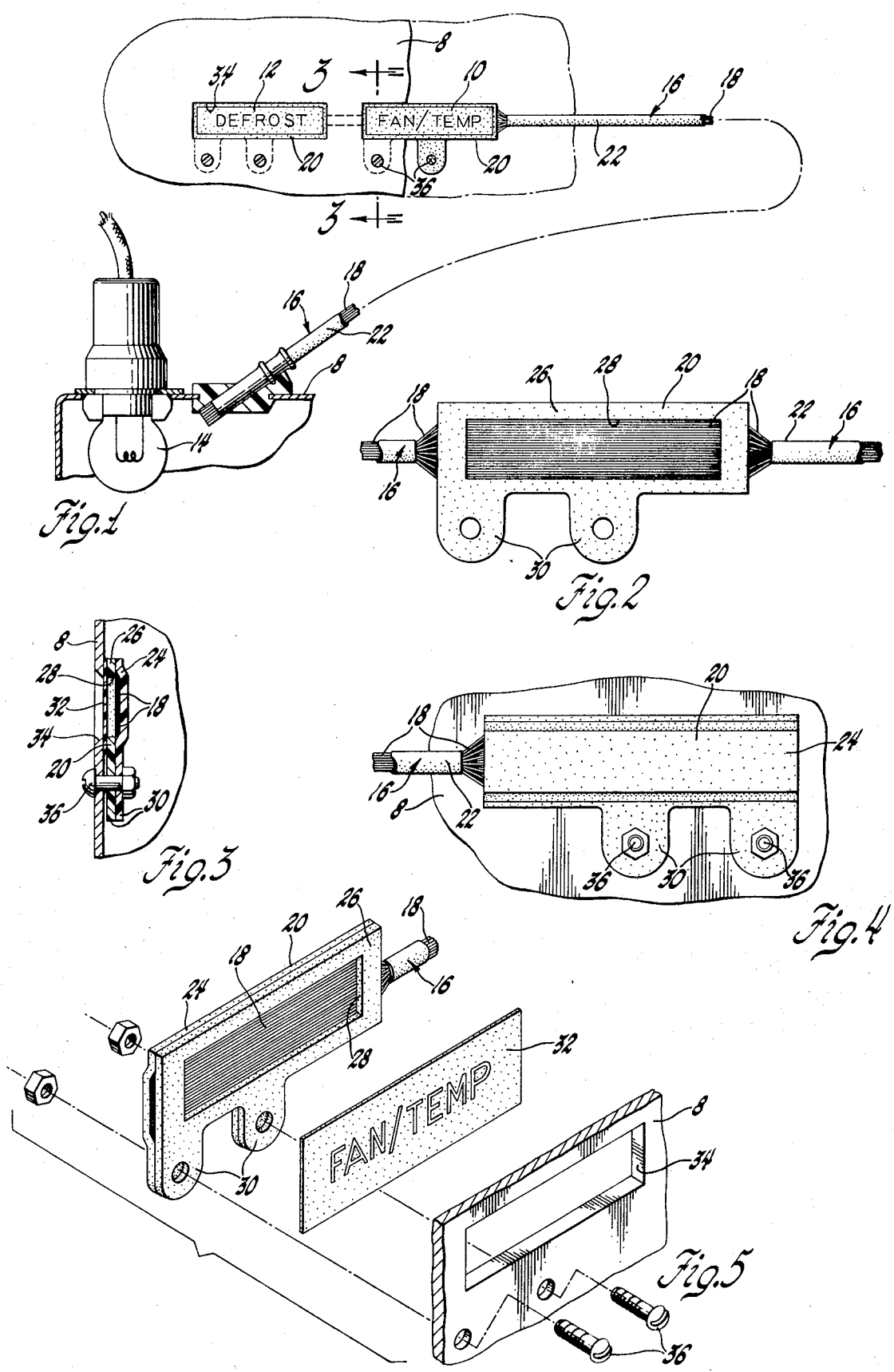

FIBER OPTIC ILLUMINATOR AND METHOD OF MAKING SAME

This invention relates to a fiber optic illuminator and a method of making the same.

It is well known as shown in the U.S. Pat. to Baer, No. 3,423,581 to use fiber optic light conductors to provide illumination at a location remote from a light source. This is carried out by providing a bundle of fiber optic filaments sheathed in a protective jacket and placing the one end of the assembly adjacent a light source so that light is emitted from the other end of the assembly to provide illumination of a legend, for example. The end of the bundle of fibers, however, is very small in cross-section, say one-sixteenth inch in diameter so that special provisions must be made for illuminating certain types of objects such as a rectangular legend. In addition, since the assembly has only one end remote from the light source, only one area can be illuminated by such an arrangement.

It is therefore an object of this invention to provide in a fiber optic bundle, an illuminator capable of emitting light from a surface area which is large with respect to the cross-section of a fiber optic bundle.

It is a further object of this invention to provide intermediate the ends of a fiber optic bundle, an illuminator capable of emitting light from a large surface area.

Another object of the invention is to provide a method of forming a large area illuminator in a fiber optic bundle of substantially circular cross-section.

The invention is carried out by providing a substantially circular bundle of fiber optic filaments and a protective jacket around the bundle along part of its length leaving a portion of the filaments exposed at each location where an illuminator is desired, and a mounting element at each such location supporting the exposed portion of the filaments in a spreadout array of thin cross-section where the exposed filaments are treated to allow the lateral escape of light therefrom.

The invention is further carried out by providing an illuminator in a fiber optic bundle of substantially circular cross-section and covered with a protective jacket by removing the jacket from the location at which an illuminator is desired, spreading the thus exposed filaments of the fiber optic bundle into an array of thin cross-section and large area, retaining the spread filaments in the desired cross-section, and treating the filaments to allow lateral escape of light therefrom.

The above and other advantages will be made more apparent from the following specification taken in conjunction with the accompanying drawings wherein like reference numerals refer to like parts and wherein:

FIG. 1 is a partly broken way view of an illuminator according to the invention installed in an instrument panel and supplied by a light source;

FIGS. 2 and 4 are front and rear elevational views respectively of an illuminator according to the invention;

FIG. 3 is a cross-sectional view of the illuminator taken along lines 3—3 of FIG. 1; and, FIG. 5 is an exploded view of an illuminator assembly with a panel and applique.

As shown in FIG. 1, illumination for a pair of translucent legends 10 and 12 on a vehicle instrument panel 8 is provided by a lamp 14 located remotely from the legends and a conventional fiber optic light conductor 16 having integrally formed therewith an illuminator 20 adjacent each legend, one at the end of the light conductor 16 and the other intermediate the ends. The fiber optic light conductor 16 as is well known comprises within a protective jacket 22 a plurality of filaments 18 of say, 16 or 32 in number, each filament comprising a core of glass or plastic transparent material having a high index of refraction and a thin coating of material having a lower index of refraction so that total internal reflection occurs within the core, thus permitting light entering one end of the filament to be transmitted therethrough and out the other end. When, however, the coating material of the filament is at least partially removed by abrasion or other disturbance, then at least a portion of the light is permitted to escape laterally from the core.

As shown in detail in FIGS. 2 and 3, each illuminator 20 comprises a section of the fiber optic bundle 16 from which the jacket 22 has been removed and the filaments spread out in an array having a thin, wide cross-section. Preferably the filaments are arranged side by side in a single plane. To support the filaments 18 and maintain the desired configuration, a backup plate 24 is provided to which the filaments are secured, the backup plate being formed with a recess to receive the filaments. Preferably the filaments 18 are held in place by a frame 26 secured to the backup plate with transparent adhesive, the frame containing a window 28 through which light from the filaments may pass. Due to the recess in the backup plate, the frame fits flush against the outer sides of the backup plate. The backup plate and the frame each have a pair of ears 30 at one side for convenience in attaching the illuminator to the instrument panel 8 in the desired location. Alternatively, the filaments may be secured by the backup plate by adhesive so that the frame may be omitted. In still another embodiment, both the adhesive and the frame may be used to maintain integrity of the assembly. The material of the backup plate may be metal or plastic, although the surface should be white or otherwise reflecting to optimize the efficiency of the illuminator. While the preferred embodiment of the illuminator is flat, it will be understood that for certain applications it may be desirable to provide an illuminator of a curved or other convenient configuration.

The filaments are treated to permit the lateral escape of light therefrom as by abrading or hot stamping with a roughened block, for example, to partially break up the coating on the filaments. Although light escapes from the filaments, sufficient light continues to be conducted along the filaments to enable the illumination of other illuminators incorporated in the same fiber optic bundle. The size of each illuminator may vary according to design considerations, however, a typical illuminator may have a window opening of 5/16 inches by 1½ inches.

As will be apparent from the above description, the illuminator is formed in a fiber optic bundle by removing the protective jacket from the light conductor at the desired location and the filaments thus exposed are spread preferably in a single layer of thickness and are treated to permit the lateral light escape. The filaments are secured to the backup plate by adhesive or are sandwiched between the backup plate and the frame.

In use, as shown in FIGS. 4 and 5, the illuminator may be positioned behind a translucent legend 32 and mounted over an perture 34 in an instrument panel 8 to provide backlighting for the legend when the lamp is turned on. Alternatively, the legend may be formed as a part of the illuminator assembly as by securing a translucent applique bearing the legend either on top or beneath the frame. The illuminator is attached to the panel 8 by threaded fasteners 36 extending through the ears 30.

The embodiment of the invention described herein is for purposes of illustration and the scope of the invention is intended to be limited only by the following claims:

What is claimed is:

1. A fiber optic illuminator for providing illumination at a location remote from a light source comprising
   a plurality of fiber optic filaments arranged in a bundle of generally circular cross-section terminating at one end adjacent a light source,
   a protective jacket around the bundle along part of its length leaving the filaments exposed for the remainder of the length of the bundle, and
   means for supporting the exposed portion of the filaments in an outspread array of laterally elongated cross-section to form an illuminator of large surface area, the exposed filaments being treated to allow lateral escape of light therefrom.

2. A fiber optic illuminator for providing illumination at a location remote from a light source comprising
   a plurality of fiber optic filaments arranged in a bundle of generally circular cross-section terminating at one end adjacent a light source, each fiber comprising a transparent core of high index of refraction and a coating of lower index of refraction,
   a protective jacket around the bundle along part of its length leaving the filaments exposed for the remainder of the length of the bundle, and
   a backing member secured to the exposed filaments for supporting the exposed portion of the filaments in a flat outspread array of laterally elongated cross-section to form an illuminator of large surface area, the exposed filaments having the coating thereof at least partially removed to allow lateral escape of light therefrom.

3. A method of making a fiber optic illuminator of large surface area comprising the steps of
   providing a bundle of fiber optic filaments the bundle having a generally circular cross-section and a protective jacket along its length,
   removing the jacket along a portion of the bundle to expose a portion of the filaments,
   spreading out the exposed portion of the filaments into a wide array of thin cross-section and retaining the exposed portion of the filaments in the desired cross section, and
   treating the exposed portion of the filaments to allow lateral escape of light therefrom.

4. A method of making a fiber optic illuminator of large surface area comprising the steps of
   providing a bundle of fiber optic filaments the bundle having a generally circular cross-section and a protective jacket along its length, each fiber comprising a transparent core of high index of refraction and a coating of lower index of refraction,
   removing the jacket along a portion of the bundle to expose a portion of the filaments,
   spreading out the exposed portion of the filaments into a wide array of thin cross-section and mounting the exposed portion of the filaments on a supporting member for retaining the exposed portion of the filaments in the desired cross-section, and
   treating the exposed portion of the filaments to allow lateral escape of light therefrom by disturbing the filament coating.

* * * * *